E. M. HEYLMAN, DEC'D.
CITIZEN'S TRUST & SAVINGS BANK, ADMINISTRATOR.
MOTOR CLUTCH THROW-OUT.
APPLICATION FILED JAN. 4, 1919.
1,378,953.
Patented May 24, 1921.
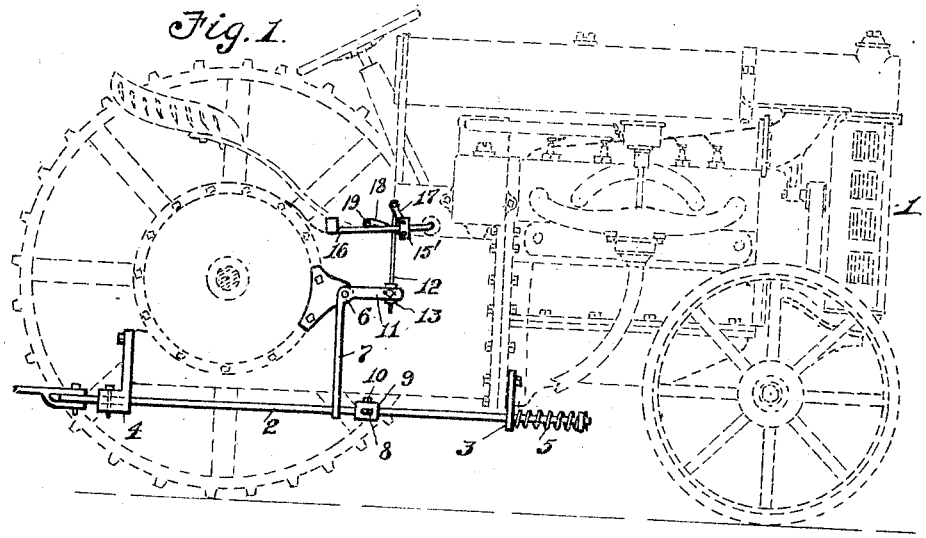
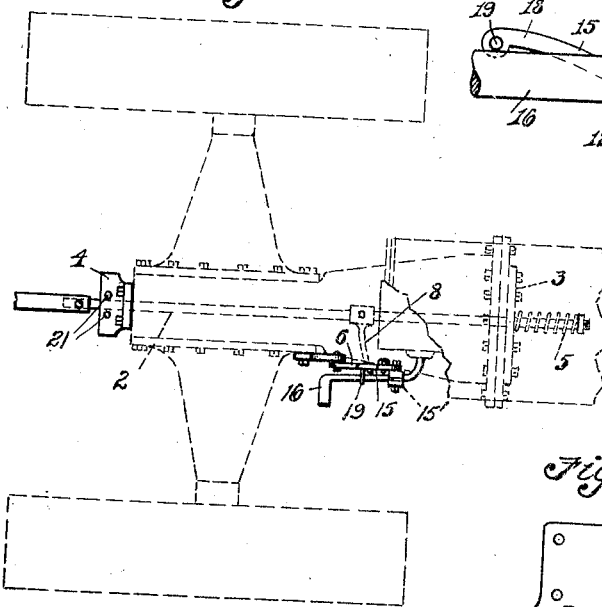
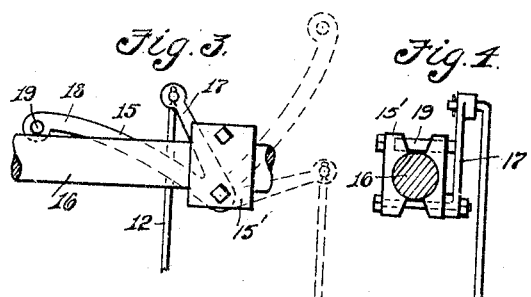
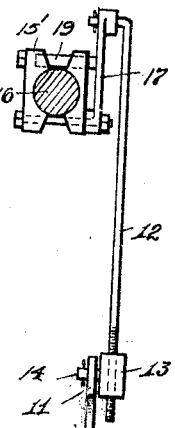
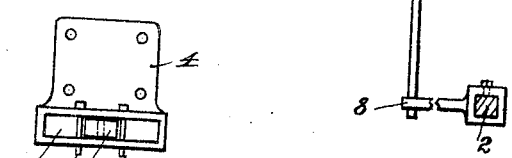
Inventor:
EDWARD M. HEYLMAN
By George J. Oltsch
ATTORNEY.

UNITED STATES PATENT OFFICE.

EDWARD M. HEYLMAN, OF SOUTH BEND, INDIANA; CITIZEN'S TRUST & SAVINGS BANK, OF SOUTH BEND, INDIANA, ADMINISTRATOR OF SAID EDWARD M. HEYLMAN, DECEASED.

MOTOR-CLUTCH THROW-OUT.

1,378,953.  Specification of Letters Patent.  Patented May 24, 1921.

Application filed January 4, 1919. Serial No. 269,667.

*To all whom it may concern:*

Be it known that I, EDWARD M. HEYLMAN, a citizen of the United States, residing at South Bend, in the county of St. Joseph and State of Indiana, have invented certain new and useful Improvements in Motor-Clutch Throw-Outs, of which the following is a specification.

The invention relates to an improvement in tractor-clutch throw-outs, wherein provision is made for automatically throwing out the clutch in the event the draw bar is subjected to a load strain in excess of that required for usual service, whereby to prevent a possible breaking strain on the parts subjected to such stress.

The invention generally comprehends a means instantly responsive to excessive load strain to shift the clutch lever to a release position, whereby the tractor is held from further movement under power of the engine, and a breaking strain, incident to a continuance of the excessive load strain, avoided. The means utilized in carrying out the details of the invention is designed to permit immediate control by the driver of the clutch following such automatic release, and without relieving the load strain if desired, for example, that the tractor may be reversed in direction, or continued in movement.

In essential detail, the invention comprises a draw-bar operating against a spring tensioned to resist compression under predetermined load strain, and to yield under a load strain which is excessive. The draw-bar in movement under such excessive load strain, operates a lever, which in turn, through an angle lever, depresses the clutch lever to throw out the clutch. The angle lever which is fulcrumed on the clutch lever, is particularly arranged with relation to such fulcrum, so that following the automatic movement of the clutch lever, the driver, by a further movement thereof, may shift the angle-lever fulcrum, and so relieve the clutch lever for operation in the usual manner. This permits the driver to regain control of the movement of the tractor at any and all times, and without regard to the automatic throw-out, so that the function of the latter is that of an automatic protector without interfering in any manner with the usual manual control.

The invention is illustrated in the accompanying drawings, in which:

Figure 1 is a view in elevation, illustrating a tractor with the automatic throw-out in position.

Fig. 2 is a plan of the rear end of the tractor, showing the throw-out details.

Fig. 3 is a view in elevation, showing the form and mounting of the angle lever, the inoperative position of such lever following the manual operation of the clutch and shifting thereof immediately succeeding the automatic operation to release the clutch, being shown in dotted lines.

Fig. 4 is a front elevation of the operating parts of the throw-out, the clutch lever and draw-bar being in section.

Fig. 5 is a rear elevation of the draw-bar hanger.

The improved automatic throw-out is here shown as applied to a tractor, designated generally as 1, and includes a draw-bar 2, mounted in front and rear hangers 3 and 4. A spring 5 is coiled about the draw-bar in advance of the forward hanger 3, which spring is tensioned to resist compression under a load strain to a predetermined degree, a further compression under excessive load strain permitting a longitudinal movement of the draw-bar.

An L-shaped lever 6 is mounted on a bracket secured to an appropriate part of the tractor frame, the long arm 7 of which lever depends in the path of movement of a trip-arm 8, projecting from a sleeve 9, adjustably secured on the draw-bar through a set screw 10. The trip arm, in the longitudinal movement of the draw-bar under excessive load strain, engages the arm 7 of lever 6, to operate such lever.

The short arm 11 of lever 6 is connected to a pull rod 12, through a coupling 13. This coupling, which is threaded to receive the threaded end of the rod 12, for adjustment, has a lateral pin 14, seating in an opening in the free end of arm 11 of lever 6, a cotter pin, or other fastening preventing separation. The rod 12 will thus follow the lever 6 in movement, but is capable of independent movement, as will be obvious.

An angle lever 15 is pivotally mounted or fulcrumed on a bracket 15', removably secured to the clutch lever 16, by bolts or the like. This angle lever has a short arm 17, and a long arm 18, and in the normal position of the parts, as shown in full lines in Fig. 3, both arms project on the same side of the pivot or fulcrum of the lever. The long arm 18 is terminally provided with a bar or rod 19, adapted to overlie the clutch lever 16, while the short arm 17 is terminally connected to the upper end of the pull rod 12.

Obviously, longitudinal movement of the draw-bar, under excessive load strain, causes the trip arm 8 to engage and operate the lever 6, and through the pull rod 12, move the angle lever to cause the rod 19 to bear upon and depress the clutch lever 16. The extent of movement is, of course, sufficient to disengage the clutch, thus freeing the tractor from the power of the engine. If it is desired to regain control of the propulsion of the tractor without relieving the load strain, for example, as in backing, the operator will depress the clutch lever 16 beyond that incident to the automatic operation, as all clutches have a free movement beyond that point necessary to their disengagement. This further movement of the clutch lever permits the angle lever 15 to be manually shifted to the other side of its pivot or fulcrum, or to inoperative position with relation to the clutch lever, as plainly shown by dotted lines in Fig. 3. The clutch lever is now free, and may be permitted to throw the clutch at will, or, in other words, the driver has complete control. Following readjustment or relief of the excessive load strain conditions, the angle lever may be restored to normal or operative position by depressing the clutch lever and manually shifting the angle lever so that both arms thereof will be on the proper side of its fulcrum, that is, in their initial position, and the parts are again ready and set to respond to overload strain on the draw-bar.

The implement connecting end of the draw-bar is capable of being shifted laterally for particular connections, such as for changing the line of draft between the tractor and the implement, a detail whereby such movement is permitted being shown in Fig. 5. The rear hanger is here shown as formed with an elongated way 20, in which the draw-bar is slidably mounted, and in which, as by pins 21, the draw bar may be held in a variety of positions. To compensate for this movement of the draw-bar, and yet secure effective action of the throw-out at the same degree of overload, the trip-arm 8 is preferably curved on a radius corresponding to the swing of the draw-bar, in adjustment, so that the trip-arm will engage the lever 6 under the same degree of movement of the draw-bar in all adjustments of such draw-bar.

The threaded connection of the pull rod 12 with the coupling 13, as described, permits the convenient adjustment of the extent of movement of the draw-bar necessary to operate the throw-out. By lengthening or shortening the pull rod, the lever 6 will be correspondingly moved to bring the free end of the arm 7 of such lever normally in desired distance adjustment with relation to the trip-arm. This will provide for a shorter or longer movement of the draw-bar to operate the throw-out, as may be desired.

The parts of the improved throw-out are here shown as applied to a tractor through various supporting brackets, bolted or otherwise secured in place. This provides for the application of the invention to tractors now in use or completed, though it is obviously apparent that the details described may be mounted in or on integral supports built as a part of a tractor, where the improvement is to be embodied as a part of a tractor as built.

The important feature of the invention resides in the throw-out adapted to be automatically responsive to an overload strain, and at the same time so constructed and arranged that the driver may at once regain control of the clutch mechanism for all usual purposes, and this without other than what is in effect the usual clutch operating movement. The parts of the tractor and following implement are thus completely safeguarded against breakage or overthrow through excessive load strain, as when the implement engages underground immovable objects, such as rocks, roots, and the like. The invention is primarily designed for application to tractors, though it is obviously applicable to any mechanical draft means designed to be protected against excessive load strain.

While the foregoing is the preferred form of my invention, I desire it to be understood that I do not limit myself to the precise structure shown and described, as it is obvious that the same may be variously modified without departing from the spirit of the invention.

What is claimed is:—

1. An overload throw-out for clutches, comprising a member movable under the overload, and a clutch operating element actuated by said member to release the clutch, such clutch being freed from the influence of such element through further movement of the clutch operating element in the release direction.

2. An overload throw-out for clutch operating levers, comprising a member movable under overload, and an element actuated by said member to engage and move the clutch lever to release position, said element being movable to an inoperative position to free the clutch lever upon further manual movement of such clutch lever in the release direction.

3. An overload throw-out for clutch levers, comprising a member movable under overload, and an angle lever fulcrumed on said clutch lever and operable by said member to engage and move the clutch lever to clutch release position, said angle lever being movable to inoperative position after a succeeding manual movement of the clutch lever in release direction, to thereby relieve the clutch lever of the influence from such element.

4. An overload throw-out for clutch levers, comprising an angle lever fulcrumed on said clutch lever, said angle lever having two arms projecting on the same side of the fulcrum, a member operable by the overload, a connection between said member and one arm of the angle lever, and a rod projecting from the other arm and bearing on the clutch lever.

5. An overload throw-out for clutch levers, comprising a member movable under overload, an angle lever fulcrumed on the clutch lever and having two arms on the same side of the fulcrum, one of said arms bearing on the clutch lever, and a connection between said member and the other arm of the angle lever, whereby to permit shifting of the angle lever to inoperative position upon a manual movement of the clutch lever succeeding the throw-out movement thereof.

6. The combination with a tractor having a clutch operating lever, of a drawbar; means to permit longitudinal movement of the draw-bar under excessive load strain, an angle lever fulcrumed on the clutch lever and carrying a part to bear on said clutch lever, a trip carried by the draw-bar, and means engaged by the trip in the longitudinal movement of the draw-bar to actuate the angle lever and thereby move the clutch lever.

7. A tractor having a clutch operating lever, a draw-bar longitudinally movable under excessive load strain, an angle lever mounted on the clutch lever and having a part bearing on said lever, a trip lever mounted on the tractor, a trip carried by the draw-bar to engage and operate the trip lever in the longitudinal movement of the draw-bar, and an adjustable connection between the angle lever and trip lever.

8. A clutch lever throw-out for tractors, including a draw-bar held against movement except under overload, an angle lever fulcrumed on the clutch lever and having a part bearing on the clutch lever, a trip on the draw-bar, a trip lever pivotally supported on the tractor, and a pull rod connected to the angle lever and to the trip lever, the connection of the pull rod and trip lever being adjustable and pivoted.

9. A throw-out for tractor clutch levers, comprising a draw-bar movable under overload, an angle lever fulcrumed on the clutch lever and having two arms, one of said arms having a part adapted to bear on the clutch lever, a pull rod connected to the other arm, a trip lever supported for pivotal movement, a coupling pivotally and detachably connected to said trip lever and threaded to receive the pull rod, and a trip carried by the draw-bar to engage and operate the trip lever in the overload movement of the drawbar.

10. A clutch lever throw-out including a throw-out means mounted on the clutch lever and movable under excessive load strain to operate the clutch lever in a release direction, said means being adapted to be rendered inoperative with relation to the clutch lever upon a farther movement of such clutch lever in the release direction.

In testimony whereof I affix my signature.

EDWARD M. HEYLMAN.